(12) United States Patent
Heyl

(10) Patent No.: US 11,802,774 B2
(45) Date of Patent: Oct. 31, 2023

(54) DETERMINING VEHICLE ACTIONS BASED UPON ASTRONOMICAL DATA

(71) Applicant: Robert Bosch GmbH, Stuttgart (DE)

(72) Inventor: Andreas Heyl, Renningen (DE)

(73) Assignee: Robert Bosch GmbH, Stuttgart (DE)

( * ) Notice: Subject to any disclaimer, the term of this patent is extended or adjusted under 35 U.S.C. 154(b) by 264 days.

(21) Appl. No.: 16/723,575

(22) Filed: Dec. 20, 2019

(65) Prior Publication Data

US 2021/0190518 A1    Jun. 24, 2021

(51) Int. Cl.
*G01C 21/34* (2006.01)
*G05D 1/02* (2020.01)

(52) U.S. Cl.
CPC ..... *G01C 21/3461* (2013.01); *G01C 21/3415* (2013.01); *G01C 21/3446* (2013.01); *G05D 1/0278* (2013.01)

(58) Field of Classification Search
CPC ........... G01C 21/3461; G01C 21/3446; G01C 21/3415; G01C 21/26–21/3492; G01C 21/3617; G05D 1/0278
See application file for complete search history.

(56) References Cited

U.S. PATENT DOCUMENTS

| 9,188,985 | B1 * | 11/2015 | Hobbs | G01C 21/3676 |
|---|---|---|---|---|
| 10,262,471 | B2 | 4/2019 | Kislovskiy | |
| 2015/0266488 | A1 * | 9/2015 | Solyom | B60W 50/0205 |
| | | | | 701/28 |
| 2017/0123434 | A1 | 5/2017 | Urano | |
| 2017/0234689 | A1 | 8/2017 | Gibson | |
| 2018/0046182 | A1 * | 2/2018 | Joyce | B60W 50/0225 |
| 2018/0164107 | A1 * | 6/2018 | Yalla | G01C 21/3461 |
| 2018/0259966 | A1 | 9/2018 | Long | |
| 2019/0078899 | A1 | 3/2019 | Iagnemma | |
| 2019/0120640 | A1 * | 4/2019 | Ho | G01C 21/3453 |
| 2019/0185010 | A1 * | 6/2019 | Ganguli | B60W 30/18163 |
| 2019/0204827 | A1 * | 7/2019 | Bhalla | G05D 1/0061 |
| 2019/0146509 | A1 | 9/2019 | Dean | |
| 2019/0294167 | A1 * | 9/2019 | Kutila | G06Q 10/04 |

OTHER PUBLICATIONS

U.S. Department of Transportation, "Preparing for the Future of Transportation," Automated Vehicles 3.0, Oct. 2018, 80 pages.

* cited by examiner

*Primary Examiner* — Jeffrey C Boomer
(74) *Attorney, Agent, or Firm* — Michael Best & Friedrich LLP

(57) ABSTRACT

Methods and systems for determining an action for a vehicle. The system includes an electronic controller configured to determine a planned route of the vehicle, determine local astronomical data based upon the planned route, compare the local astronomical data to the planned route of the vehicle to determine a probability of completion of the planned route, and if the probability of completion is below a threshold, generate a command indicating an action for the vehicle.

20 Claims, 4 Drawing Sheets

DETERMINING VEHICLE ACTIONS BASED UPON ASTRONOMICAL DATA

Embodiments relate to determining actions for a vehicle based upon local astronomical data.

BACKGROUND

The operation design domain ("ODD") of an autonomous or partially autonomous vehicle includes the operating conditions under which a given automated driving system ("ADS") or feature thereof is designed to function. An ODD may include environmental, geographical, and time-of-day restrictions. Typically, an ADS is limited to operating in the ODD. Driving outside of the ODD is not safe and may, therefore, not be allowed or only be allowed for a limited amount of time before the autonomous vehicle must stop operating.

One aspect of an ODD is the current lighting conditions of the driving environment of the vehicle. If lighting conditions are poor, such as at night, during overcast or stormy weather, or other poor visibility conditions, vehicle sensors, such as cameras, may not be able to perceive the driving environment sufficiently enough to properly control the vehicle.

SUMMARY

Therefore, among other objects, one object of some embodiments is to predict when lighting conditions will change based upon local astronomical data. In one example, predicting when lighting conditions will change is based on or accomplished by predicting when the sun will set along a planned route of the vehicle. If the planned route cannot be completed before lighting conditions are outside of the ODD, other actions are taken in order to ensure safe operation of the vehicle.

One embodiment provides a system for determining an action for a vehicle. The system includes an electronic controller configured to determine a planned route of the vehicle, determine local astronomical data based upon the planned route, compare the local astronomical data to the planned route of the vehicle to determine a probability of completion of the planned route, and if the probability of completion is below a threshold, generate a command indicating an action for the vehicle.

Another embodiment provides a method for determining an action for a vehicle. The method includes determining, with an electronic controller, a planned route of the vehicle; and determining, with the electronic controller, local astronomical data based upon the planned route. The method also include comparing, with the electronic controller, the local astronomical data to the planned route of the vehicle to determine a probability of completion of the planned route; and if the probability of completion is below a threshold, generating, with the electronic controller, a command indicating an action for the vehicle.

These and other features, aspects, and advantages will be apparent from a reading of the following detailed description and a review of the associated drawings. It is to be understood that both the foregoing general description and the following detailed description are explanatory and do not restrict aspects as claimed.

DETAILED DESCRIPTION

One or more embodiments are described and illustrated in the following description and accompanying drawings. These embodiments are not limited to the specific details provided herein and may be modified in various ways. Furthermore, other embodiments may exist that are not described herein. Also, the functionality described herein as being performed by one component may be performed by multiple components in a distributed manner. Likewise, functionality performed by multiple components may be consolidated and performed by a single component. Similarly, a component described as performing particular functionality may also perform additional functionality not described herein. For example, a device or structure that is "configured" in a certain way is configured in at least that way, but may also be configured in ways that are not listed. Furthermore, some embodiments described herein may include one or more electronic processors configured to perform the described functionality by executing instructions stored in non-transitory, computer-readable medium. Similarly, embodiments described herein may be implemented as non-transitory, computer-readable medium storing instructions executable by one or more electronic processors to perform the described functionality. As used in the present application, "non-transitory computer-readable medium" comprises all computer-readable media but does not consist of a transitory, propagating signal. Accordingly, non-transitory computer-readable medium may include, for example, a hard disk, a CD-ROM, an optical storage device, a magnetic storage device, a ROM (Read Only Memory), a RAM (Random Access Memory), register memory, a processor cache, or any combination thereof.

In addition, the phraseology and terminology used herein is for the purpose of description and should not be regarded as limiting. For example, the use of "including," "containing," "comprising," "having," and variations thereof herein is meant to encompass the items listed thereafter and equivalents thereof as well as additional items. The terms "connected" and "coupled" are used broadly and encompass both direct and indirect connecting and coupling. Further, "connected" and "coupled" are not restricted to physical or mechanical connections or couplings and can include electrical connections or couplings, whether direct or indirect. In addition, electronic communications and notifications may be performed using wired connections, wireless connections, or a combination thereof and may be transmitted directly or through one or more intermediary devices over various types of networks, communication channels, and connections. Moreover, relational terms such as first and second, top and bottom, and the like may be used herein solely to distinguish one entity or action from another entity or action without necessarily requiring or implying any actual such relationship or order between such entities or actions.

Figure 1:
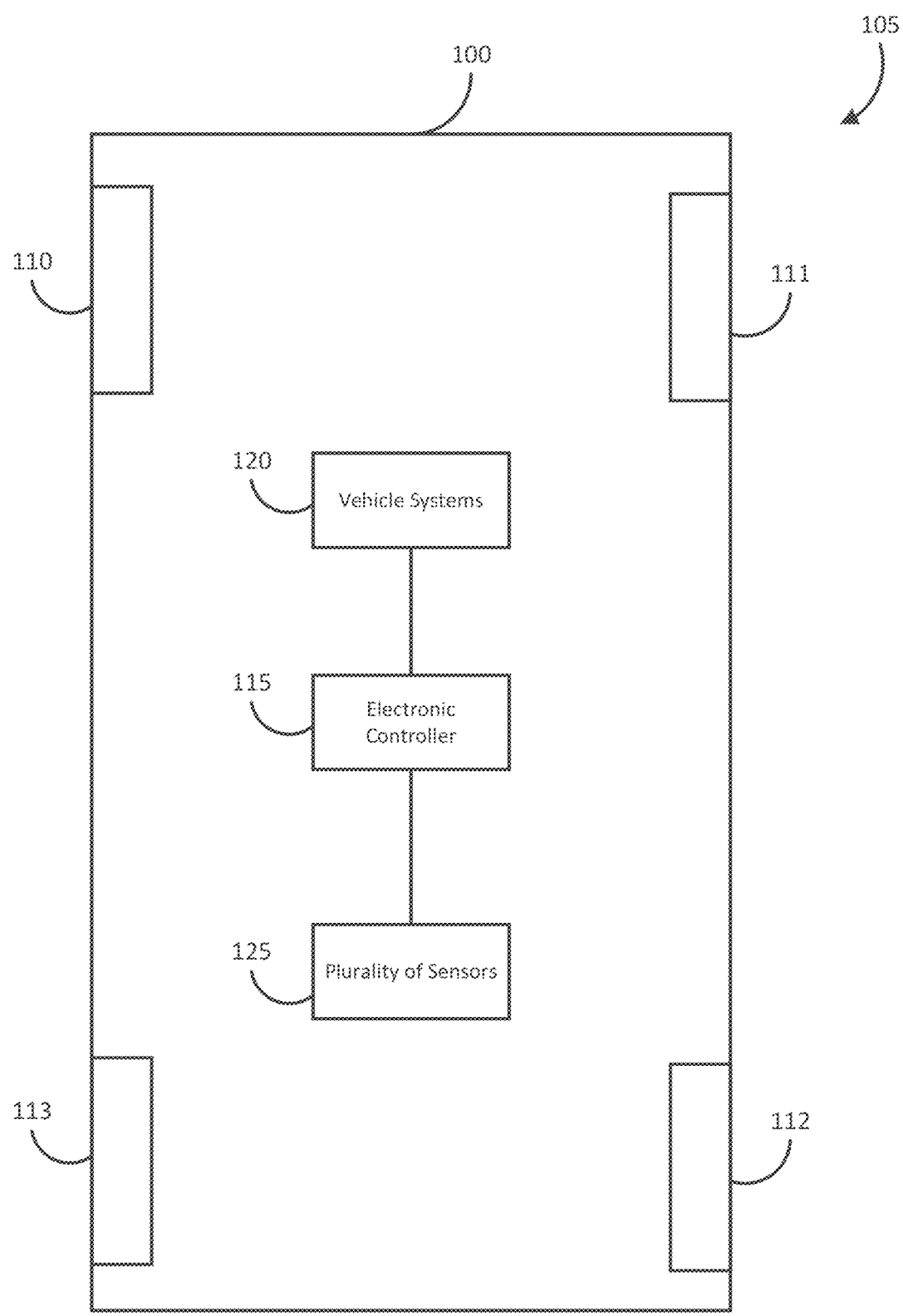
FIG. 1 illustrates a vehicle equipped with an ADS according to one embodiment.

FIG. 1 illustrates a vehicle 100 equipped with an ADS 105 according to one embodiment. In the example, illustrated, the vehicle 100 is illustrated as an automobile having 4 wheels 110-113. In other embodiments, the vehicle 100 may be a motorcycle, a tractor-trailer, a truck, or some other form of vehicle having different number of wheels.

Figure 2:
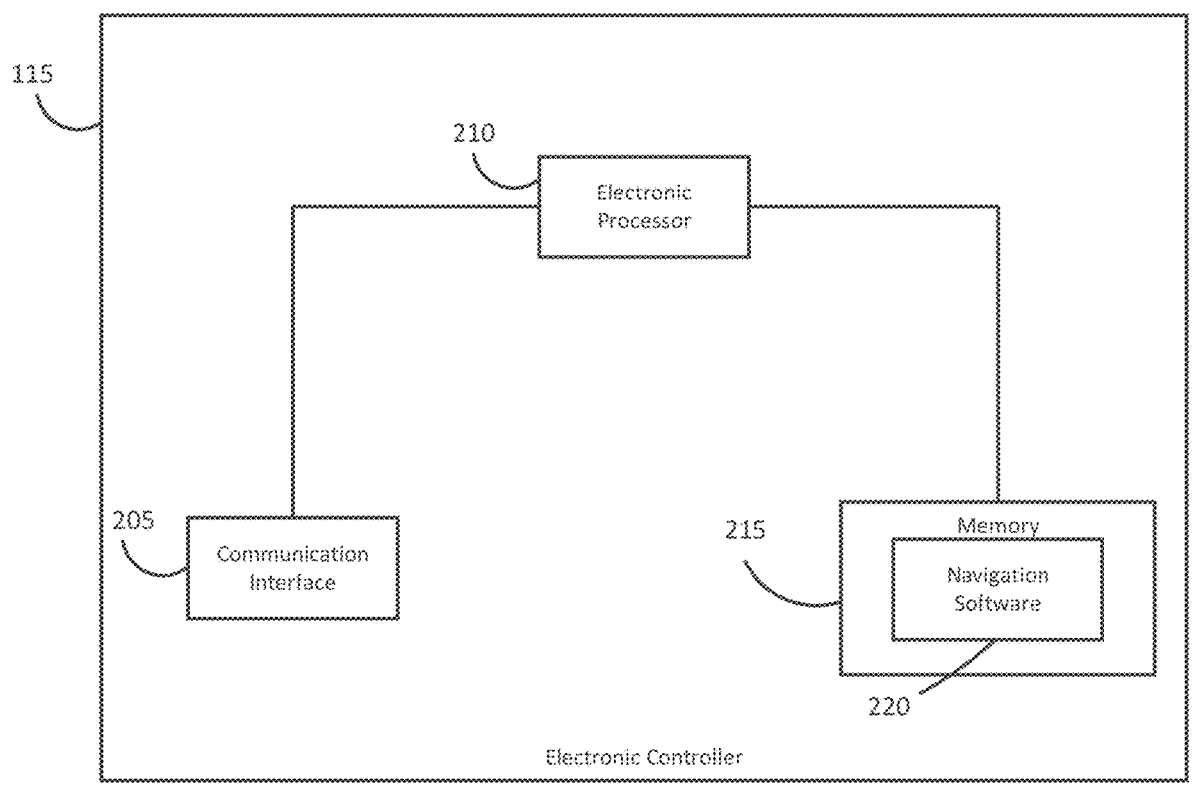
FIG. 2 illustrates an electronic controller according to one embodiment.

The ADS 105 includes an electronic controller 115 communicatively coupled to other vehicle systems 120 and a plurality of sensors 125. An example of the electronic controller 115 is illustrated in FIG. 2. The electronic controller 115 includes a communication interface 205, an electronic processor 210, and a memory 215. The communication interface 205 allows the electronic processor 210 to communicate with external hardware, such as the vehicle systems 120 and the plurality of sensors 125. The electronic processor 210 is communicatively coupled to the communication interface 205 and the memory 215. The electronic processor 210 is configured to access the memory 215 and, among other things, execute instructions for the ADS 105. The electronic processor 210 may be a microprocessor, an application-specific integrated circuit, or a similar processing circuit. The memory 215 is a non-transitory, computer-readable medium and contains instructions that, amongst other things, perform the methods and functions described herein when executed by the electronic processor 210.

In one embodiment, the memory 215 includes vehicle navigation software 220. Because the ADS 105 is automatically driving the vehicle 100, the navigation software 220 allows the ADS 105 to select a route for the vehicle 100 for driving from a route origin to a route destination. The navigation software 220 may also include a digital map of the driving area of the vehicle 100 and may be in communication with a remote server to constantly update the digital map based upon the location of the vehicle 100. The digital map may include road features, traffic information, construction information and other road closures, and other environmental features. By using the digital map, the navigation software 220 is able to determine potential routes from the route origin to the route destination and select a planned route based upon driving time for each potential route, traffic information, road closure information, and other factors, such as the safety of each route.

The navigation software 220, through the remote server, may also access local astronomical data and weather data based upon the location of the vehicle 100. For example, the navigation software 220 may access a sunrise time, a sunset time, a moonrise time, a moonset time, a sun angle, a phase of the moon, and other astronomical data. The navigation software 220 may also access weather data, such as possibility of precipitation, amount of current precipitation, an upcoming weather forecast, Returning to FIG. 1, the vehicle systems 120 include, for example, steering systems, braking systems, propulsion systems, navigation systems, communication systems, lighting systems, and other systems that must be controlled by the ADS 105.

The plurality of sensors 125 includes one or more sensors configured to gather data about the driving environment of the vehicle 100. The plurality of sensors 125 may include one or more cameras, one or more radar sensors, one or more LIDAR sensors, one or more electro-optical sensors, one or more luminosity sensors, and other types of sensors for use in autonomous operation of the vehicle 100 by the ADS 105. Each of the plurality of sensors 125 can be located on any portion of the vehicle 100.

Some of the plurality of sensors 125 may be limited by environmental conditions. For example, during night operation of the vehicle 100 or during operation of the vehicle 100 during overcast periods of time (or other environments where lighting conditions are poor), cameras will not be able to gather accurate image data of the driving environment of the vehicle 100. In another example, cameras, radar sensors, and LIDAR sensors may not gather accurate data during periods of time where precipitation, such as rain or snow, impairs data collection. Because these conditions make operation of the vehicle 100 by the ADS 105 unsafe, other actions must be taken in order to ensure the safety of passengers and the vehicle 100.

Figure 3:
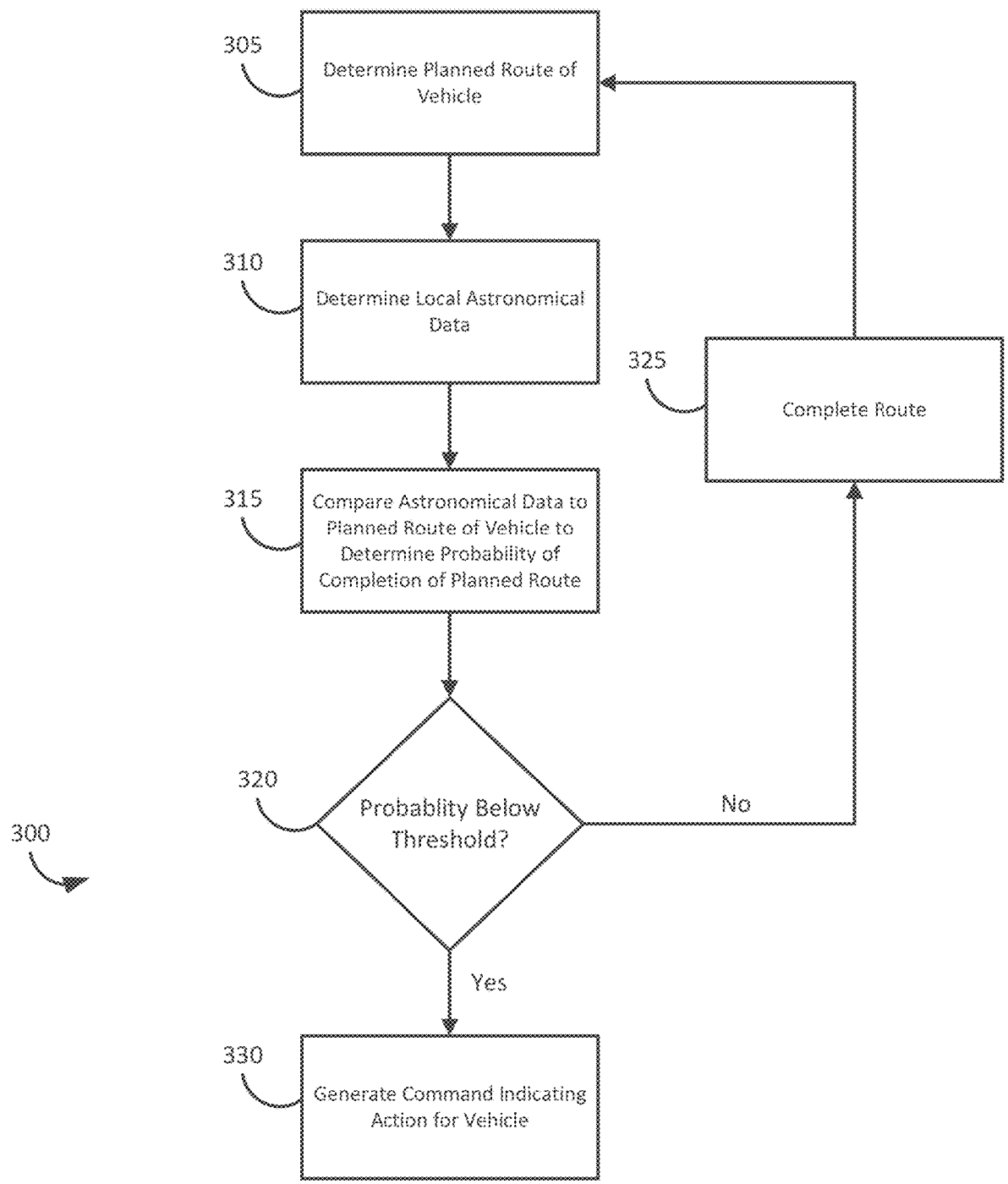
FIG. 3 illustrates a method for determining an action for a vehicle according to one embodiment.

FIG. 3 illustrates a method 300 for determining an action for the vehicle 100 according to one embodiment. The method 300 includes determining, with the electronic controller 115, a planned route for the vehicle 100 (at block 305) and determining, with the electronic controller 115, local astronomical data based upon the planned route (block 310).

Figure 4:
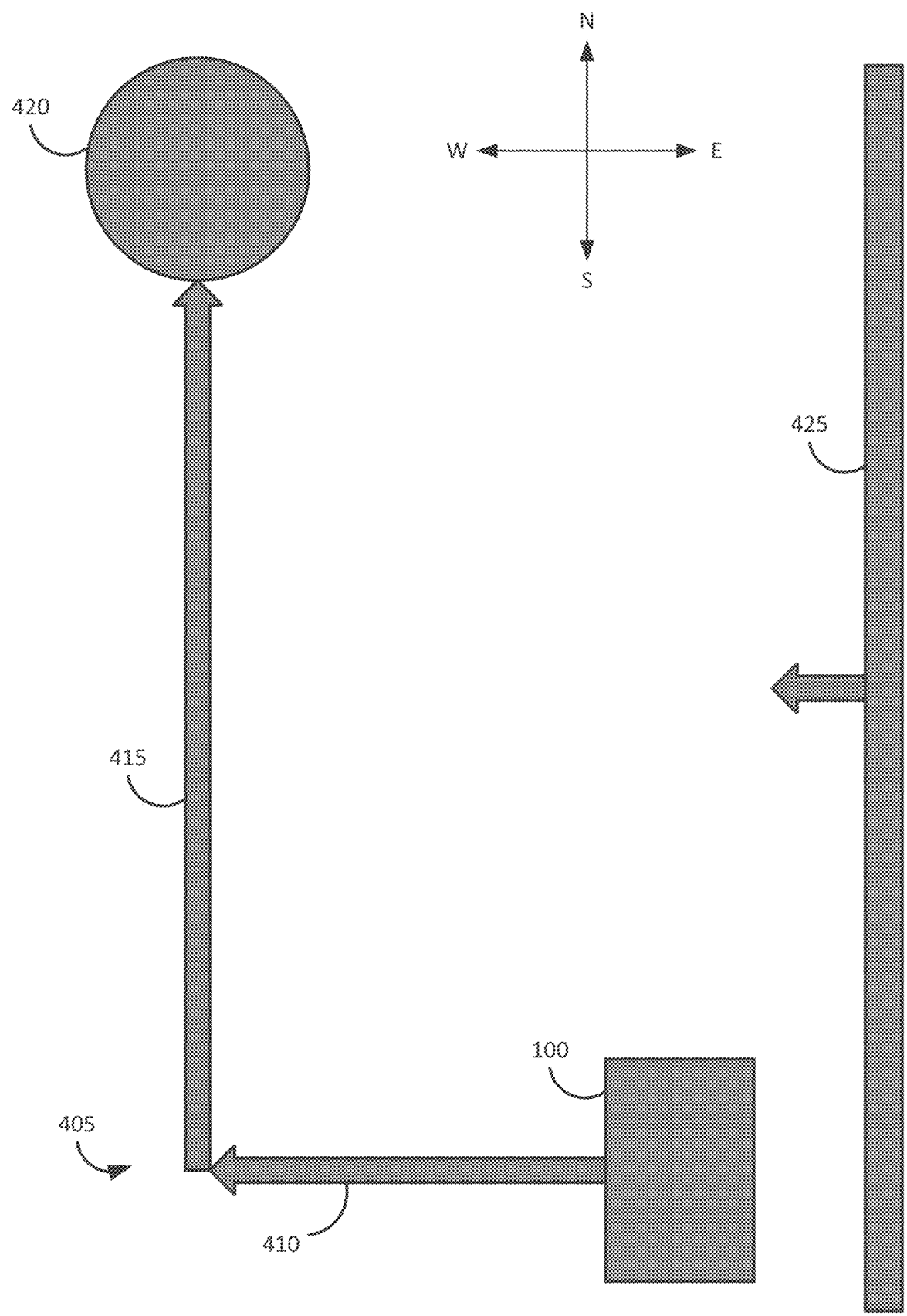
FIG. 4 illustrates a planned route of a vehicle according to one embodiment.

For example, FIG. 4 illustrates a planned route 405 for the vehicle 100. The planned route 405 includes route portions 410 and 415 and ends at route destination 420. The vehicle 100 may be at a route origin or may be in transit along the planned route 405 to the route destination 420. Route portions 410 and 415 are meant for purely illustrative purposes. It is to be understood that the planned route 405 may include more or less route portions than the two illustrated route portions 410 and 415.

When accessing local astronomical data, the electronic controller 115 may access the local astronomical data from a remote server for any portion of the planned route 405, such as a current position of the vehicle 100, route portions 410 or 415, and the route destination 420. For example, the electronic controller 115 may access a sunset time for the current position of the vehicle 100 or the route destination 420, as at the sunset time particular sensors of the plurality of sensors 125 may no longer operate at full capacity, leading to more dangerous driving situations.

The electronic controller 115 may also access weather data from the remote server. In one example, the electronic controller 115 accesses weather data and determines the current weather status, for example, clear, overcast, precipitation, and others. Certain weather conditions, for example, overcast and precipitation, may hinder the ability of the plurality of sensors 125 to gather data. The accessed weather data includes, for example, a forecast, a weather radar map, and other data.

In one embodiment, the electronic controller 115 is also configured to determine a sun shadow 425 based upon local astronomical data, the weather data, or both. The sun shadow 425 indicates which areas are now past sunset or otherwise do not have sufficient lighting conditions or other environmental factors for the plurality of sensors 125 to accurately gather data, endangering the vehicle 100. In FIG. 4, the sun shadow 425 is a sun shadow of a sunset, moving from east to west. In other embodiments, such as a sun shadow caused by incoming weather, the sun shadow 425 may move in other directions. The electronic controller 115 is configured to use the local astronomical data, the weather data, or both to determine how quickly the sun shadow 425 moves and when different areas are covered by the sun shadow 425. In some embodiments, the electronic controller 115 is configured to determine astronomical data for multiple locations along the planned route 405.

Returning to FIG. 3, the method 300 includes comparing, with the electronic controller 115, the local astronomical data to the planned route to determine a probability of completion of the planned route (block 315). For example, the electronic controller 115 determines an estimated completion, or the time it takes to reach the route destination from the current location of the vehicle 100, and compares that amount of time to a time when a sun shadow reaches a portion of the planned route, the current location of the vehicle 100, or the route destination. The electronic controller 115 then determines the probability or likelihood that the planned route is completed before the sun shadow makes operation of the vehicle 100 unsafe. The probability may be determined as a binary value ("will complete" or "will not complete") or may be some other value indicative of the probability that the planned route will be completed, such as a percentage indicating the chance of completion of the planned route.

In some embodiments, the probability of completion is determined using additional information, for example, traffic data. In one example, the electronic controller 115 is configured to determine current traffic data for the planned route and modify an expected completion time of the planned route based upon the amount of traffic along the planned route. The traffic data may include construction data, traffic congestion data, road closures, and other events that impact traffic along the planned route. In addition, the electronic controller 115 may utilize a model stored on the remote server to predict traffic data if current traffic data is not available. Based upon current and predicted traffic data, the electronic controller 115 modifies the expected completion time of the route.

Another possible data could include current lighting conditions gathered by the plurality of sensors 125. For example, light sensors could detect a current illumination level surrounding the vehicle 100 and use this data in addition to sun shadow and traffic data in order to determine if the planned route will be completed.

The method 300 also includes comparing the probability of completion to a threshold (at block 320). The threshold may be manually set by a user, automatically determined by the electronic controller 115, set on the remote server and accessed by the electronic controller 115, or otherwise determined. For example, based on the local astronomical data, weather data, other data from the plurality of sensors 125, the navigation software 220, traffic data, and others, the electronic controller 115 may automatically determine the threshold using a suitable algorithm.

If the probability of completion is above the threshold, the ADS 105 controls the vehicle 100 to complete the planned route (at block 325). However, if the probability of completion is below the threshold, the ADS 105 generates a command to take an action for the vehicle 100 (at block 330).

In one example, the action for the vehicle 100 is not departing on the planned route. For example, if the current location of the vehicle 100 is a route origin of the planned route, the ADS 105 may generate a command instructing the vehicle 100 to not depart along the planned route and instead stay parked at the route origin until lighting conditions or other environmental conditions are deemed to fall within parameters of the ODD of the vehicle 100. So, for example, the vehicle might remain at its current position until sunrise the next day or after overcast weather has passed.

The action for the vehicle 100 may include generating a command to navigate the vehicle 100 to a known safe harbor location instead of navigating the vehicle 100 to the route destination. The safe harbor location may be along the planned route or in a location different than the planned route that is closer to the current location of the vehicle 100 than the route destination. Known safe harbors may be identified in the navigation software 220 or may be determined by the electronic controller 115 by accessing the remote server. Once the vehicle 100 reaches the safe harbor, the ADS 105 generates a command to park the vehicle 100 at the safe harbor until conditions are again within parameters of the ODD.

Another possible action for the vehicle 100 is stopping the vehicle at its current location. If the route destination and a safe harbor location are not reachable before the lighting conditions or other environmental conditions, the ADS 105 is configured to end driving along the planned route and instead stop the vehicle 100 at the current location.

In some embodiments, data from the plurality of sensors 125 may be used by the electronic controller 115 to determine a safe spot or area for the vehicle 100 to park at the current location. For example, after generating the command to stop the vehicle 100 at the current location, the electronic controller 115 receives video from the plurality of sensors 125 and identifies a safe spot for parking, such as a parking space, a parking lot, a driveway, or other place away from driving lanes, traffic, and pedestrians.

If the action for the vehicle 100 is stopping at the current location, the electronic controller 115 may be further configured to send a message to a remote location indicating that the vehicle 100 needs to be retrieved by a human operator, such as a driver or a tow truck. For example, if the vehicle 100 stops at a parking space, the vehicle 100 may need to be retrieved in order to avoid parking citations, parking on private property for an extended period of time, or other potential issues with stopping the vehicle 100 at the current location.

The action for the vehicle 100 may also include re-planning the planned route to allow for completion of the planned route before the sun shadow reaches the route destination. In one example, to re-plan the planned route, the electronic controller 115, using the navigation software 220, analyzes various alternative routes to reach the route destination before the sun shadow arrives at the route destination. The alternative routes may be shorter than the planned route, have less traffic than the planned route, travel on roads with higher speed limits, and otherwise reduce travel time in order to reach the route destination before the sun shadow reaches the route destination. In some embodiments, alternative routes include routes with better lighting conditions, such as including more streetlights. This may be determined based upon accessing a digital map indicating where streetlights are placed or by using light sensors from the plurality of sensors 125.

In one embodiment, the route is re-planned by prioritizing selecting alternative routes or portions of alternative routes that travel east and west along a latitude instead of driving along alternative routes or portions of alternative routes that travel north and south. By prioritizing east-west travel routes, the ADS 105 can take routes that travel in parallel with the moving sun shadow instead of routes perpendicular to the moving sun shadow, maximizing the amount of time spent moving in the same direction as the movement of the sun shadow (e.g., "staying in front of the sun shadow").

The prioritization of east-west routes over north-south routes is accomplished using a cost function. For example, the cost function maximizes the amount of time spent on an east-west highway, where the vehicle 100 can travel at a higher speed and avoid surface street traffic. The cost function may also be used to prioritize selection of east-west routes and north-south routes based upon various traffic delays, known road features such as traffic lights, one-way streets, multi-lane roads, roundabouts, number of left turns necessary to reach the route destination, and other features of the driving environment.

A probability density function may be used to evaluate a probability of the vehicle 100 encountering the sun shadow for individual portions of the planned route. An overall cost function can then be calculated as the sum of the probability density function outputs for each segment of the planned route. Based upon the overall cost function and a calculation of an overall cost function for alternative routes, the route may be re-planned or another action may be taken as described above.

The following examples illustrate example systems and methods described herein.

Example 1: a system for determining an action for a vehicle, the system comprising an electronic controller configured to determine a planned route of the vehicle, determine local astronomical data based upon the planned route, compare the local astronomical data to the planned route of the vehicle to determine a probability of completion of the planned route, and if the probability of completion is below a threshold, generate a command indicating an action for the vehicle.

Example 2: the system of example 1, wherein the probability of completion of the planned route is further determined based on traffic data along the planned route.

Example 3: the system of any of examples 1-2, wherein the action is an action selected from the group consisting of not departing on the planned route, navigating the vehicle to a safe location to stop, stopping the vehicle at a current location of the vehicle, and re-planning the planned route to allow completion.

Example 4: the system of example 3, wherein the navigating the vehicle to the safe location to stop includes navigating the vehicle to a known safe harbor location.

Example 5: the system of example 3, wherein stopping the vehicle at the current location further includes sending a message to a remote location indicating that the vehicle needs to be retrieved.

Example 6: the system of example 3, wherein re-planning the route includes modifying at least one portion of the route to reduce driving time.

Example 7: the system of example 3, wherein re-planning the route includes modifying at least one portion of the route to prioritize travelling along a latitude instead of a longitude.

Example 8: the system of example 7, wherein the modification of the at least one portion of the route is determined based upon a cost function associated with a sun shadow determined from the local astronomical data.

Example 9: the system of any of examples 1-8, wherein the local astronomical data is determined from a remote server.

Example 10: the system of any of examples 1-9, wherein the local astronomical data includes astronomical data for a current position of the vehicle, astronomical data for a destination of the planned route, and astronomical data for at least one portion of the planned route.

Example 11: a method for determining an action for a vehicle, the method comprising determining, with an electronic controller, a planned route of the vehicle; determining, with the electronic controller, local astronomical data based upon the planned route; comparing, with the electronic controller, the local astronomical data to the planned route of the vehicle to determine a probability of completion of the planned route; and if the probability of completion is below a threshold, generating, with the electronic controller, a command indicating an action for the vehicle.

Example 12: the method of example 11, wherein the probability of completion of the planned route is further determined based on traffic data along the planned route.

Example 13: the method of any of examples 11-12, wherein the action is an action selected from the group consisting of not departing on the planned route, navigating the vehicle to a safe location to stop, stopping the vehicle at a current location of the vehicle, and re-planning the planned route to allow completion.

Example 14: the method of example 13, wherein the navigating the vehicle to the safe location to stop includes navigating the vehicle to a known safe harbor location.

Example 15: the method of example 13, wherein stopping the vehicle at the current location further includes sending a message to a remote location indicating that the vehicle needs to be retrieved.

Example 16: the method of example 13, wherein re-planning the route includes modifying at least one portion of the route to reduce driving time.

Example 17: the method of example 13, wherein re-planning the route includes modifying at least one portion of the route to prioritize travelling along a latitude instead of a longitude.

Example 18: the method of example 17, wherein the modification of the at least one portion of the route is determined based upon a cost function associated with a sun shadow determined from the local astronomical data.

Example 19: the method of any of examples 11-18, wherein the local astronomical data is determined from a remote server.

Example 20: the method of any of examples 11-19, wherein the local astronomical data includes astronomical data for a current position of the vehicle, astronomical data for a destination of the planned route, and astronomical data for at least one portion of the planned route.

Thus, embodiments described herein provide, among other things, systems and methods for determining an action for a vehicle. Various features, advantages, and embodiments are set forth in the following claims.

What is claimed is:

1. A system for determining an action for a vehicle having an operation design domain, the system comprising
an electronic controller configured to
determine a planned route of the vehicle;
determine local astronomical data based upon the planned route;
compare the local astronomical data to the planned route of the vehicle to determine a probability of completion of the planned route by the vehicle before an occurrence of a condition of the local astronomical data causes vehicle operation to occur outside of the operation design domain based on an estimated amount of time of travel of the vehicle and a time associated with the occurrence of the condition of the local astronomical data associated with a portion of the planned route, wherein the condition is a sun shadow proximate to the portion of the planned route that causes a decrease in an illumination level surrounding the vehicle, wherein the amount of time of travel is associated with travel from a current location of the vehicle to the portion of the planned route, wherein the probability of completion is a value other than a binary value; and
if the probability of completion is below a threshold, control movement of the vehicle to avoid the occurrence of the condition.

2. The system of claim 1, wherein the probability of completion of the planned route is further determined based on traffic data along the planned route.

3. The system of claim 1, wherein the movement is at least one selected from the group consisting of: not departing on the planned route, navigating the vehicle to a safe location to stop, and stopping the vehicle at a current location of the vehicle.

4. The system of claim 3, wherein the navigating the vehicle to the safe location to stop includes navigating the vehicle to a known safe harbor location.

5. The system of claim 3, wherein stopping the vehicle at the current location further includes sending a message to a remote location indicating that the vehicle needs to be retrieved.

6. The system of claim 3, wherein re-planning the route includes modifying at least one portion of the route to reduce driving time.

7. The system of claim 3, wherein re-planning the route includes modifying at least one portion of the route to prioritize travelling along a latitudinal direction instead of a longitudinal direction relative to the condition.

8. The system of claim 7, wherein the modification of the at least one portion of the route is determined based upon a cost function associated with the sun shadow determined from the local astronomical data, wherein the sun shadow indicates a lack of sufficient lighting conditions.

9. The system of claim 1, wherein the local astronomical data is received from a remote server.

10. The system of claim 1, wherein the local astronomical data includes astronomical data for a current position of the vehicle, astronomical data for a destination of the planned route, and astronomical data for at least one portion of the planned route.

11. A method for determining an action for a vehicle having an operation design domain, the method comprising
   determining, with an electronic controller, a planned route of the vehicle;
   determining, with the electronic controller, local astronomical data based upon the planned route;
   comparing, with the electronic controller, the local astronomical data to the planned route of the vehicle to determine a probability of completion of the planned route by the vehicle before an occurrence of a condition of the local astronomical data causes vehicle operation to occur outside of the operation design domain based on an estimated amount of time of travel of the vehicle and a time associated with the occurrence of the condition of the local astronomical data associated with a portion of the planned route, wherein the condition is a sun shadow proximate to the portion of the planned route that causes a decrease in an illumination level surrounding the vehicle, wherein the amount of time of travel is associated with travel from a current location of the vehicle to the portion of the planned route, wherein the probability of completion is a value other than a binary value; and
   if the probability of completion is below a threshold, controlling, with the electronic controller, movement of the vehicle to avoid the occurrence of the condition.

12. The method of claim 11, wherein the probability of completion of the planned route is further determined based on traffic data along the planned route.

13. The method of claim 11, wherein controlling movement of the vehicle is at least one selected from the group consisting of: not departing on the planned route, navigating the vehicle to a safe location to stop, stopping the vehicle at a current location of the vehicle, and re-planning the planned route to allow completion.

14. The method of claim 13, wherein the navigating the vehicle to the safe location to stop includes navigating the vehicle to a known safe harbor location.

15. The method of claim 13, wherein stopping the vehicle at the current location further includes sending a message to a remote location indicating that the vehicle needs to be retrieved.

16. The method of claim 13, wherein re-planning the route includes modifying at least one portion of the route to reduce driving time.

17. The method of claim 13, wherein re-planning the route includes modifying at least one portion of the route to prioritize travelling along a latitudinal direction instead of a longitudinal direction relative to the condition.

18. The method of claim 17, wherein the modification of the at least one portion of the route is determined based upon a cost function associated with the sun shadow determined from the local astronomical data, wherein the sun shadow indicates a lack of sufficient lighting conditions.

19. The method of claim 11, wherein the local astronomical data is received from a remote server.

20. The method of claim 11, wherein the local astronomical data includes astronomical data for a current position of the vehicle, astronomical data for a destination of the planned route, and astronomical data for at least one portion of the planned route.

* * * * *